United States Patent
Grafton

(10) Patent No.: US 7,255,503 B2
(45) Date of Patent: Aug. 14, 2007

(54) DUAL NUMERICAL KEYBOARD BASED ON DOMINANCE

(75) Inventor: Charlene H. Grafton, 47 Marina Cove Dr. #211, Niceville, FL (US) 32578

(73) Assignee: Charlene H. Grafton, Niceville, FL (US)

( * ) Notice: Subject to any disclaimer, the term of this patent is extended or adjusted under 35 U.S.C. 154(b) by 0 days.

(21) Appl. No.: 11/097,752

(22) Filed: Apr. 4, 2005

(65) Prior Publication Data

US 2006/0110203 A1    May 25, 2006

Related U.S. Application Data

(60) Provisional application No. 60/571,678, filed on May 17, 2004.

(51) Int. Cl.
    *B41J 5/00* (2006.01)
(52) U.S. Cl. .................. 400/489; 400/472; 400/486; 400/485; 341/22
(58) Field of Classification Search ............... 400/485, 400/486, 489; 341/22
    See application file for complete search history.

(56) References Cited

U.S. PATENT DOCUMENTS

| | | | | |
|---|---|---|---|---|
| 4,522,518 A | * | 6/1985 | Schmidt | 400/486 |
| 4,824,268 A | * | 4/1989 | Diernisse H. V. | 400/486 |
| 5,575,576 A | * | 11/1996 | Roysden, Jr. | 400/472 |
| 5,584,588 A | * | 12/1996 | Harbaugh | 400/486 |
| 6,445,380 B1 | * | 9/2002 | Klein | 345/168 |
| 6,712,534 B2 | * | 3/2004 | Patel | 400/486 |
| 6,830,396 B2 | * | 12/2004 | Kurriss | 400/486 |
| 6,943,776 B2 | * | 9/2005 | Ehrenburg | 345/168 |

* cited by examiner

*Primary Examiner*—Ren Yan
*Assistant Examiner*—Matthew Marini

(57) ABSTRACT

There is a need to develop a more sophisticated educational system of keyboard set ups for not only the disabled population from their worker's compensation injuries but for the entire continuum of keyboard, keypad and mouse users nationally and internationally for the prevention of computer related injuries. Due to the rising medical costs associated with upper extremity sprains and strains and more importantly, carpal tunnel syndrome, design companies are making ergonomic changes in the mouse, keyboard design. However, these changes are being made without regard for the user's dominance. Now a long term solution has been invented based on two simple tests by noted researchers. The dual system of keyboard/keypad, mouse or calculator input device selection based on the computer users human factors of dominance will have a decided impact on the reduction of computer related work force injuries or for other people with disabilities.

2 Claims, 6 Drawing Sheets

Figure 1:
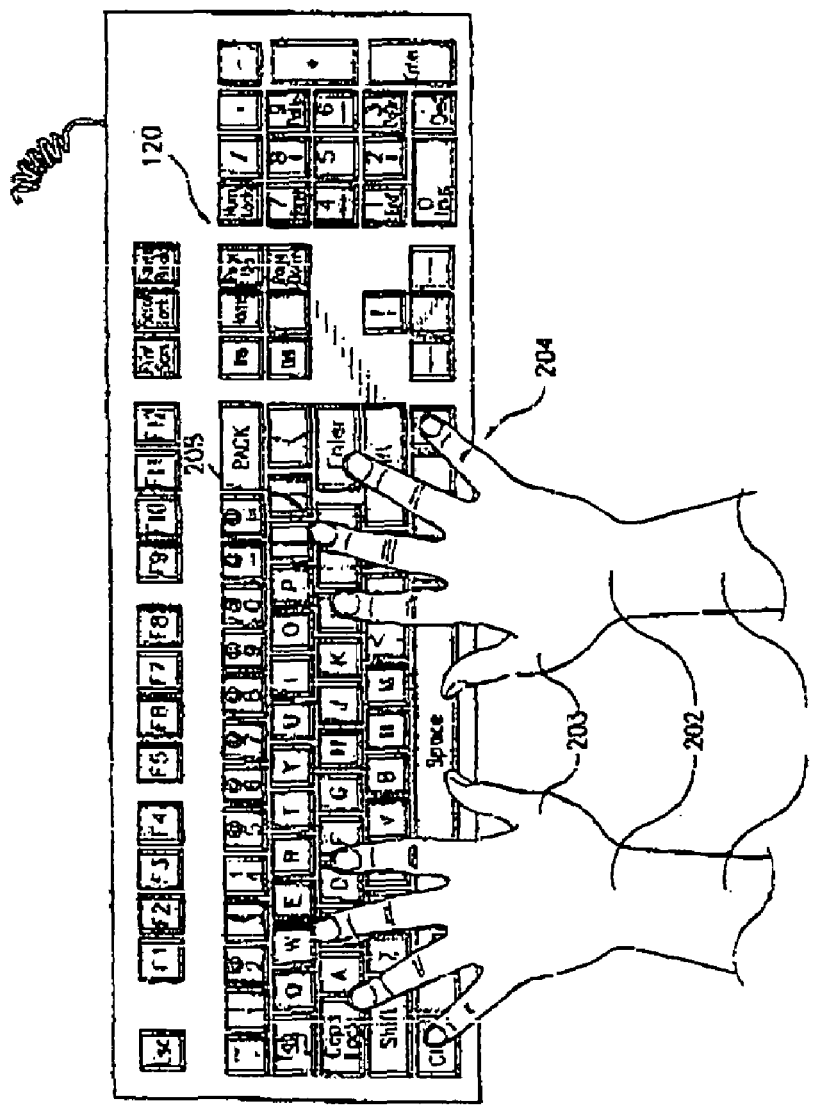

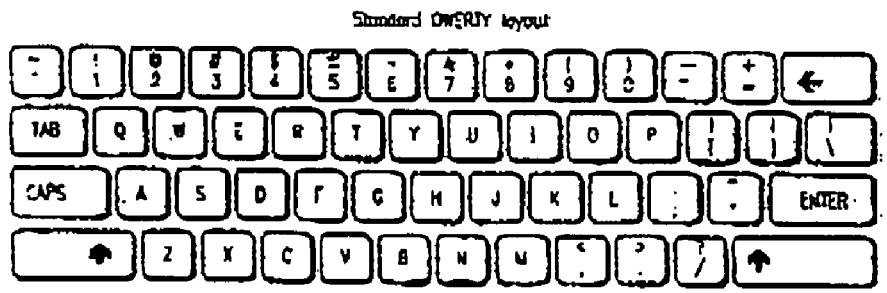
FIG. 2A
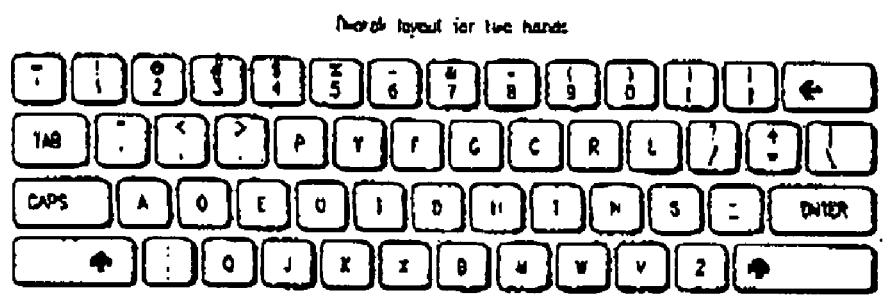
FIG. 2B
Fig. 2

| Prnt Screen SysRq | Scroll Lock | Pause Break | 110 | 1234567890.098765432 M=9876543210.012345678 | | | |
|---|---|---|---|---|---|---|---|
| INSERT | HOME | PAGE UP | | NUM LOCK | / | . | - |
| DEL | END | PAGE DOWN | MR Opt | 7 home | 8 ↑ | 9 pgup | |
| Alt Lock | Ctrl Lock | Seq Lock | M+ Ctrl | 4 ← | 5 | 6 → | |
| DUAL LOCK | ↑ | | M- Alt | 1 end | 2 ↓ | 3 pgdn | ENTER |
| ← | ↓ | → | MC Win | 0 ins | | del | |

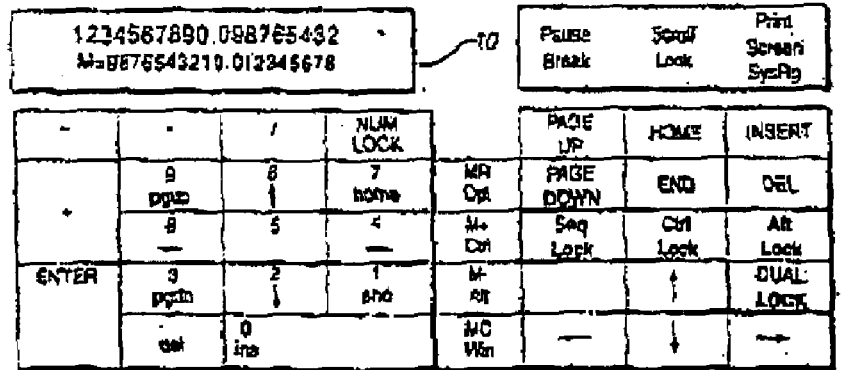
*Fig. 4A*
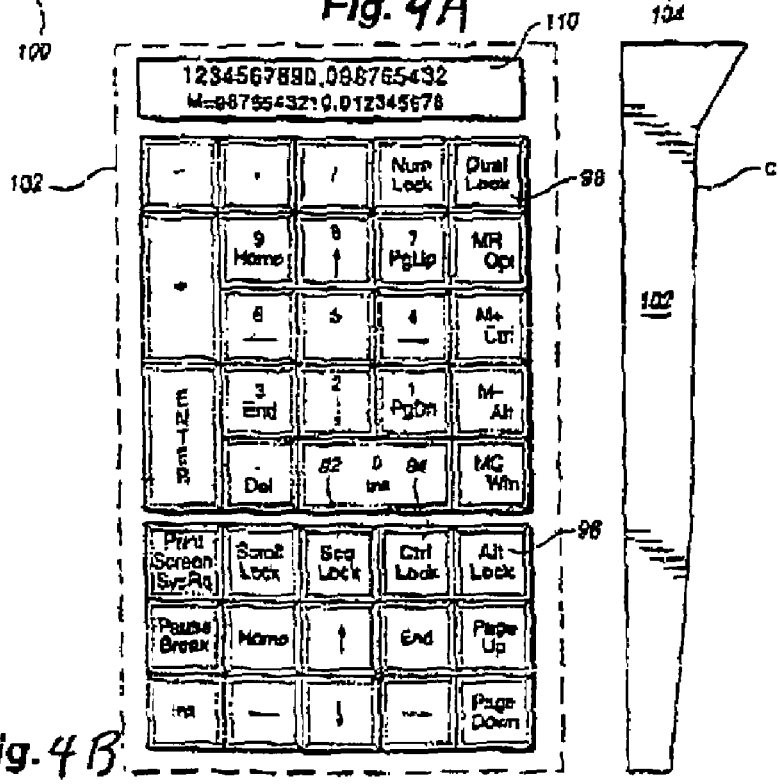
*Fig. 4B*
*Fig. 4*

DUAL NUMERICAL KEYBOARD BASED ON DOMINANCE

This patent addresses the development of a more scientific and educational system of computer keyboard/keypad set ups for not only the disabled population from their worker's compensation injuries but for the entire continuum of keyboard/keypad users world wide and claims benefit of application 60/571,678 filed May 17, 2004.

Hand, finger, wrists, upper arms and shoulders of the computer user are wearing out due to the overloaded right side of the computer keyboard/numerical keypad and office machine calculator. The Bureau of Labor Statistics (BLS) data reveal the extraordinary (9×) increase of work related cumulative trauma disorders reported in the United States from 1981 to 1991. This is due to the rising medical costs associated but also for the days out of work as the Bureau of Labor Statistics report for upper extremity sprains and strains and more importantly, carpal tunnel syndrome. This invention with patent and copyright will have a dramatic ergonomic impact on computer and keypad users. The demand for rapid alphabet data and numerical data entry into computers by workers has been the driving factor behind the multitude of computer and software improvements. Many new patents have been issued for programmable keypads and adapters for dual systems.

NIOSH in their documents, ask What if I want to use an alternative keyboard? One of their answers is to "allow users to try a keyboard on a trial basis before buying it. It would seem reasonable to try the keyboard for at least one to two weeks, since studies show that this amount of time is necessary to adapt to alternative keyboards". Trial and error purchasing is waste, not only for the consumer but for corporate America. Following dexterity training for left hand usage for numerical data entry and set up of a numerical keypad (already found on standard keyboards) on both right hand side and left hand side, or the mouse on both right hand side and left hand side, the worker will be able to alternate the use of the hands, thereby decreasing the keystrokes of the right hand with a dual keypad or dual mouse system. Following the device selection method comprising instruction to determine cerebral dominance for directionality, then selection of the individual's numerical data input device, calculator for the dual keypad system. The second set of instructions is finger circling to determine selection of a pointing device (mouse) for the dual mouse system. Therefore, a dual set of keyboarding may be accomplished with this patent application. The owner of this application is Charlene H. Grafton, a resident of Niceville, Fla., USA.

The Excerpts from the book, When Left is Right: Keyboarding for Success LEARNING TO USE A NUMERIC KEYPAD DEVICE WITH YOUR NON DOMINANT HAND requires a regular computer keyboard and mouse or any of the variations with a programmable or non programmable numerical keypad device for the left hand side, comparable to the right hand side with either left to right number directions or left to right number directions. The office machine calculator would be a stand alone device. The mouse or pointing device would have a right or left index finger clicker.

The objective in this system is to assist you in learning how to use the numeric or other device with the left hand. For some of you this will be your non dominant hand, if you are right handed. For those of you who are left handed or mixed handed, this will be your dominant hand. This is dexterity training with left hand usage.

The said prior special preparation for this training is computer keyboard and keypad training using the right hand side computer with mouse and keypad; the standard computer keyboard or variation. Use a keypad hub which will allow you to do all your calculations from the keypad.

The important facts you need to know to understand how the anatomy and physiology of your hands, fingers and brain organization allow you to think and do the skills necessary to learn numerical data input. Hand and finger movements have limited coordinated movements they can make. If you have been typing and completing data entry for a long time with the right hand, this will be old learning. Frequently old learning will interfere with new learning. The purpose of dexterity training is to help you with the interference within your brain organization and prior learning experiences.

TITLE OF THE INVENTION

Dual Numerical Keyboard Based on Dominance

The utility patent application is an ergonomic system with use of input devices for left hand usage for a dual numerical keypad or mouse (right and left side). The invention is directed to a hand dominated computer keyboard and keypad with a numerical keypad input device, mouse or office machine (calculator) with a number location based on dominance. The method used is 1/using the torque instructions by T. H. Blau to determine directionality for left to right or right to left for the left hand usage 2/completion of the index finger circling instructions by the Wilke-Sheely study for pointing device/mouse use, the right hand or left hand clicker for the left hand. Both instructions will allow you to make a dual system based on your dominance. Alternating use of the dual keypads and/or mouse will relieve the overuse of the right hand in your work tasks b/or other variation based on medical advice.

CROSS REFERENCE TO RELATED APPLICATIONS

No. 2003/0016985. The patent discloses an ergonomic computer keyboard which integrates a utilization of a single or dual handed, and right and left oriented keyboard.

No. 2003/0016985—The Ergonomic and Efficient Keyboard relates to keyboards, most specifically, an integrated ergonomic keyboard which utilizes a pleurality of keys in the form of characters, words and special commands to form a Multi-Dexterous Keyboard (MDK) system. A special partition of the keyboard provides numerous ergonomic arrangements with simultaneous use as either a Left-Hand-Side (LHS) or Right-Hand-Side computer keyboard module. By decreasing keystroke activity reduces Repetitive Stress Injuries (RSI) in applications.

No. 2002/0015609—The patent is directed towards an electronic keyboard having an improved ergonomic design for use with computers and other alphanumeric input electronic devices. Repetitive motion stress on a typist's hands, wrists and fingers is substantially reduced by relocating and centering the enter and backspace keys. The numeric keypad is provided as an underlay to the right-hand portion of the alphanumeric keyboard, thereby producing a very compact keyboard with full numeric keypad editing functionality.

No. D316542—The computer keyboard outlines an ornamental design difference.

No. D338665—The Computer Keyboard is an ornamental design with keys in separated positions.

No. D345152—The Ergonomic Computer Keyboard described as an ornamental design.

No. 5339097—The Computer Keyboard is used with the hands of a user disposed in a prehensile position with the thumb opposed to the fingers in a grasping position using a slanted keyboard. A keypad for locating numeric keys is positioned toward an outward end of the second keyboard surface.

No. D449611—The patent describes a one hand computer keyboard.

U.S. Pat. No. 6,682,235—The patent and invention are directed to a computer keyboard having user-manipulatable components for multi-media applications.

U.S. Pat. No. 6,830,396—The patent for Keyboard configuration is a system uses both frequency and alphabetical bases. This invention relates to desktop and laptop computers, PDAs (Personal Desktop or Digital Assistance), calculators, etc., and their successors, specifically to a manual input system for such devices. The desktop and laptop computer, the PDA, and the calculator have different systems for alphanumeric input. Examples are the desktop keyboard, the laptop keyboard, PDA keyboards, calculator keyboards, speech recognition systems, and handwriting recognition systems. Each of these input systems has serious shortcomings. Furthermore, users of more than one of these devices usually have to learn more than one system for alphanumeric input. Existing systems usually suffer from one or more of the following drawbacks: large size, difficult to learn to use, difficulty of use, awkward operation, lack of accuracy in input operation, and inability to handle character input, command input, and modified character input. Specifically, the desktop keyboard is not compact and is difficult to learn to use efficiently. The laptop keyboard, in addition, has keys that are too small. PDAs have keyboards that are too small or input systems that are inefficient. Calculator keyboards have an inefficient layout. Computer pointing devices, such as the mouse, are inefficient. Speech recognition systems are difficult to use, inaccurate, and impractical. Handwriting recognition systems are inefficient. And other input systems are not powerful enough.

For over a century the so-called Qwerty keyboard (named for the first six letters on its top row) has been the standard input device for text. A version, termed "Multi-Functional Keyboard, Version 2" was developed and defined by IBM for use with Intel-compatible personal computers ("PCs"). It has become the standard computer keyboard. Today, it is use as the keyboard for nearly all computers. In some cases it has minor modifications, such as a more compact layout for laptops or a few extra keys. The Qwerty keyboard is widely regarded as inferior to alternative input systems, such as the Dvorak keyboard (U.S. Pat. No. 2,040,248 to A. Dvorak and W. L. Dealey, 1936). Nevertheless none have been able to replace the Qwerty keyboard as a standard due to its strongly entrenched position.

The standard computer keyboard has significant disadvantages. To operate almost all keys, a finger has to move to the position of the key. This requires error-prone finger movement, leading to typing errors. Users unfamiliar with the letter layout, which was purposely designed to slow typing to prevent jamming, have to search (inefficiently) for letters. Consequently, the keyboard is difficult to use for first-time users. To type text somewhat efficiently, a user has to memorize the positions of the chaotically arranged letters. Learning such positions is difficult and requires considerable training.

To learn to operate the keyboard efficiently (using all ten digits (fingers and thumbs)) is very difficult. The user has to invest a lot in training. The user has to acquire difficult motor skills to operate the irregularly placed letter keys. The inventors of the typewriter who designed the Qwerty keyboard did not make an effort to arrange the letters ergonomically (the top row was selected merely to contain the word "typewriter"). The hardest key operations occur frequently and require simultaneous pressing of two keys, one of which is always operated by a little finger having to reach for a key. The strongest digits (the thumbs) are used for pressing only one key, the space bar. Also it is common to accidentally press the Caps Lock key, which often leads to a subsequent sequence of unintended inputs.

Relatively recently a graphical user interface with pull-down menus has become standard on computers. Around the time these graphical user interfaces were introduced, the mouse was also introduced. The mouse (or an alternative pointing device) is standard on computers today. The mouse, the touch pad, the track ball, and the joystick are examples of pointing devices. A pointing device is efficient at positioning a cursor at a position on a display because both move in two dimensions, enabling an operator to instantly map an intended movement of the cursor to a corresponding swift movement operation of the pointing device. Pointing devices are inefficient for menu and menu item selection, for which they are mainly used with graphical user interfaces. Using a mouse in combination with the standard computer keyboard requires the operator to switch between the two. This is inefficient, slow, and awkward.

The need to use a pointing device for selection purposes with graphical user interfaces is due to shortcomings of the standard computer keyboard. For selection of symbols not present on the standard computer keyboard, a pointing device in combination with a graphical user interface is easier to operate than the standard computer keyboard. Menus and menu items displayed by a graphical user interface can in many cases also be selected by pressing key combinations of keys on the standard computer keyboard. But the key combinations are difficult to press.

Recently, additional keys have been introduced on keyboards to overcome the inefficiency of the mouse at symbol selection. For example, the Microsoft Windows operating system has a flag-symbol key. The shortcomings with respect to symbol selection, however, are inherent in the design of the standard computer keyboard. Adding a key for every new symbol is not a viable solution, because in time the keyboard would become unwieldy in size.

The persistence of a standard, or Qwerty, keyboard is due to what economists call "lock-in" and "network externalities". "Lock-in arises whenever users invest in multiple complementary and durable assets specific to a particular information technology system" ("Information Rules" by C. Shapiro and H. R. Varian (Harvard Business School Press, 1999) p. 12). "When the value of a product to one user depends on how many other users there are . . . this product exhibits network externalities, or network effects" (Ibid, p. 13). Individual users of the Qwerty keyboard have invested in training specifically for the difficult-to-learn qwerty keyboard, giving rise to lock-in. The Qwerty keyboard also exhibits network externalities. It is easy to switch between keyboards, since almost all users use the Qwerty keyboard. Also the standard computer keyboard is complementary to most existing hardware and software, which again gives rise to lock-in. The keyboard furthermore has an advantage over most alternative input systems because it is mass produced and sold in a very competitive market. This makes standard computer keyboards very cheap ($5–10 for OEMs). So the standard computer keyboard potentially has at least the following important advantages over an alternative input system: training lock-in, network externalities, hardware and software lock-in, and a very low price.

The standard computer keyboard also has other advantages. The keyboard is intuitive and mostly self-explanatory. It is easy to understand how to use it and to start using it, because keys are labeled with the symbol they input. Consequently, the keyboard can immediately be used by first-time users. Learning the positions of the chaotically arranged letters is difficult, but relatively easy for hunt-and-peck typists, since they can gradually learn the position of letters while inputting text. Also, people are relatively good at remembering the positions of stationary objects they see repeatedly, such as the letters on a keyboard. Consequently, the letters on the keyboard are relatively easy to remember, which makes it easier to use for hunt-and-peck typists and also helps users somewhat who are learning to type with ten digits.

To be successful in replacing the standard computer keyboard, an alternative input system has to counter its advantages. An alternative input system should improve on, match, or compensate for the advantages of the standard computer keyboard. And an alternative input system should significantly improve on the standard computer keyboard as a whole, to make potential users switch to it. A "chord" is defined as a subset of a set of key switches. A chord is "entered" by using the key switches comprising the chord in combination.

Two-handed, ten-key chord keyboards having one two-state key switch per digit are known. These can overcome the disadvantages and counter all the advantages of the standard computer keyboard. Chord systems have traditionally been focused on the disadvantages of the Qwerty keyboard and overcoming the difficulties of chord systems. Chord systems until now however, have not (or insufficiently) countered the advantages of the Qwerty keyboard and, more recently, the advantages of the standard computer keyboard.

U.S. Pat. No. 5,575,576—The patent is a keyboard for the input of alphanumeric data.

U.S. Pat. No. 4,522,518—The character data input keyboard arrangement having central matrix of keys is a manual data entry keyboard, having left hand and right hand clusters of keys. Numeric entry is facilitated in arrangements that provide the (0) and (1) keys in the bottom row to be served by the thumbs while all fingers maintain home position on the keyboard.

U.S. Pat. No. 4,824,268—The patent is an ergonomic keyboard that is suitable for all devices interfacing with a keyboard; and that is able to transmit on unlimited amount of information including the more than 50 alphabets of the world, numbers and operational information.

U.S. Pat. No. 6,712,534—The patent is an ergonomic computer keyboard which integrates conventional keyboard features to form a Multi-Dexterous Keyboard (MDK) system designed to minimize Repetitive Stress Injuries. A special partition of the keyboard provides numerous ergonomic arrangements with simultaneous use as either a Left-Hand-Side (LHS) or Right-Hand-Side keyboard module.

U.S. Pat. No. 6,445,380—The patent for a keyboard for desktop and portable computer and the keys of the keyboard are disposed a single block of rows of juxtaposed keys, laid out on top of one another, in that all numeric keys are grouped in a single compact zone integrated to the block. Calculation and direction keys are grouped by family of function.

U.S. Pat. No. 5,584,588—The patent is a computer keyboard layout with the alphabetic keys in a specified arrangement and in straight rows and columns.

U.S. Pat. No. 5,289,389—The patent is a device for measuring response speed and accuracy. The multi-digit code generator is used for numeric or alphabetic characters or other symbols.

U.S. Pat. No. 4,680,572—The patent is a chord entry keying system of data fields for numeric or alpha data keys and entry or function keys. Another type keyboard uses the conventional ten key arrangement wherein data entry consists of serially depressing one or more numeric data keys followed by a non-numeric data entry key. The numeric keys are constituents of a numeric data field and the field is entered via a subsequent entry key depression. It is seen that because the entry key always follows the last numeric key of the numeric data field, its serial location or the location of the entry key in the keying sequence provides inherently redundant information to the keyboard processor. If the last numeric key and the entry key were depressed simultaneously rather than serially, the same information would be provided. In addition, considerable keying time would be saved since the serial time required to enter the last numeric keystroke of the numeric data field would be eliminated. It is also known that an analysis of current data entry keyboard decoding logic indicated that redundant information is present when an entry key is depressed serially after entry of every numeric data field.

In the area of dual keypad arrangements wherein the right hand makes the numeric entry and the left hand makes the function entry, there are indications of problems with current keyboard operations. In one aspect of the dual keypad arrangement, the keyboard logic rejects successive key entries occurring within 30 milliseconds of each other and provides a warning to the operator of this condition. This logic prevents many potential operator errors and appears to work successfully with successive numeric or right hand entries. However, when the left hand depresses the enter key immediately after the numeric entry, it frequently occurs within the 30 millisecond error window when no operator error has actually occurred. In other words, successive key strokes from different hands appear to occur faster than successive key strokes from the same hand. Of course, it is a known fact that operators have no problem consistently depressing the last digit of an amount and the entry key simultaneously. If this condition were allowed by the keyboard logic in dealing with an average bank document containing approximately 4.5 digits, it would reduce the entry time of each amount by an average of about 150 milliseconds or the time required for a single serial key stroke.

In the area of dual keypad arrangements wherein the right hand makes the numeric entry and the left hand makes the function entry, there are indications of problems with current keyboard operations. In one aspect of the dual keypad arrangement, the keyboard logic rejects successive key entries occurring within 30 milliseconds of each other and provides a warning to the operator of this condition. This logic prevents many potential operator errors and appears to work successfully with successive numeric or right hand entries. However, when the left hand depresses the enter key immediately after the numeric entry, it frequently occurs within the 30 millisecond error window when no operator error has actually occurred. In other words, successive key strokes from different hands appear to occur faster than successive key strokes from the same hand. Of course, it is a known fact that operators have no problem consistently depressing the last digit of an amount and the entry key simultaneously. If this condition were allowed by the keyboard logic in dealing with an average bank document containing approximately 4.5 digits, it would reduce the entry time of each amount by an average of about 150 milliseconds or the time required for a single serial key stroke.

U.S. Pat. No. 6,943,776—The patent is a manual input system for efficient generation of inputs by entering chords using a keyboard with colored keys with a legend with representation of combinations of digit-colored areas.

No. D420,996—Top surface of a left hand function control layout reverse computer keyboard.

U.S. Pat. No. 6,127,949—Ergonomic computer keyboard

U.S. Pat. No. 6,147,673—Computer input device and keyboard

U.S. Pat. No. No. 6,549,189—Method for operating a computer input device and keyboard. This patent addresses a method for operating a computer input device whereby the users may operate the left input device with their left hands and the right input device with their right hands.

U.S. Pat. No. 6,476,832—Windows display method and apparatus for the left-handed mouse U.S. Pat. No. 6,559,832—Mouse. This patent is a method using a mouse device and determining whether the mouse button setting has been made for the right-hand operating mode or a left-hand operating mode.

U.S. Pat. No. No. 6,921,054—Ergonomic Mouse

U.S. Pat. No. No. 5,504,500—User programmable orientation of cursor movement direction No. 76404455—Y-Mouse. This patent addresses using Y-mouse adapters providing a fast, easy means to connect two keyboards, two mice, or two monitors to a single port.

No. D420,996—This patent addresses the top surface of a left hand function control layout reverse computer keyboard.

STATEMENT REGARDING FEDERALLY SPONSORED RESEARCH OR DEVELOPMENT n/a

REFERENCE TO A SEQUENCE LISTING, A TABLE, OR A COMPUTER PROGRAM LISTING

The said Table 11.4 Types of Torque Responses, page 138, Dr. Theodore H. Blau (deceased), Psychological Examinations showing directions of circling with eight types of responses in cerebral dominance of right hand and left hand. Excerpt from the book When Left is Right: Keyboarding for Success. Used with permission of T. Blau Trust The Psychological Examination of the Child

TABLE 11.4

| | Types of Torque Responses | |
| | | Directions of Circling |
| Type | Right Hand | Left Hand |
| --- | --- | --- |
| 0 | Counterclockwise | Counterclockwise |
| I | Clockwise | Counterclockwise |
| II | Mixed | Counterclockwise |
| III | Clockwise | Clockwise |
| IV | Counterclockwise | Clockwise |
| V | Mixed | Clockwise |
| VI | Clockwise | Mixed |

TABLE 11.4-continued

| | Types of Torque Responses | |
| | | Directions of Circling |
| Type | Right Hand | Left Hand |
| --- | --- | --- |
| VII | Counterclockwise | Mixed |
| VIII | Mixed | Mixed |

Note: Mixed = clockwise and counterclockwise.

The said Table 1. Observed and Expected Frequencies (Number of subjects) Relative Direction on Movement of Index Fingers from the Wilke-Sheeley study page 565.

Exerpt from the book When Left is Right: Keyboarding for Success Wilke-Sheeley. Muscular or directional preferences in finger movement as a function of handedness. Cortex. 1979 Dec. 15 (4):561–9.

Used with permission of Cortex.

TABLE 1

Observed and Expected Frequencies (Number of subjects) Relative Direction on Movement of Index Fingers

| | Same | Different | |
| --- | --- | --- | --- |
| Handedness | | | |
| Right | 15 | 3 | 18 |
| | (9)☆ | (9) | |
| Ambiguous | 20 | 14 | 34 |
| | (17) | (17) | |
| Left | 4 | 14 | 18 |
| | (9) | (9) | |

☆Expected frequencies are in parenthesis.

BACKGROUND OF THE INVENTION

Copyrighted Jul. 31, 2002. Provisional patent applied May 17, 2004. Excerpts from the book When Left is Right: Keyboarding to Success by this patent writer and author, Charlene H. Grafton Regardless of type of numerical input device, alternating activity between the right hand and left hand will reduce the load on the right hand during tasks using the usual computer and numerical keypad or the computer with a stand alone numerical input device and/or mouse/pointing device.

Research categories reviewed in this section of the book are anatomy and physiology, brain organization, hand and finger movements, musicians, tactile objects (touch) discrimination, motor dominance, circling tasks, gender, performance, individual differences, old learning and new learning, training and education, left to right directionality, similar studies, musculoskeletal disorders and injury prevention.

One of the more important researchers and an engineer, Eric Haseltine wrote for Discover and Neuroquest in March of 2002 that circling movements between the extremities in clockwise and counterclockwise rotation need explanation: when the neurons controlling your arm and leg on the same side of the body work together, they do not disturb each other, but when you circle on the other side of the body in same direction, you will find it tough to do. Haseltine continues that neuroscientists have not figured out why this happens except to say that dominant regions of the brain take up more neuronal resources than non dominant areas and are therefore are more inconsiderate neural neighbors.

Finally, a summary of expectations and recommendations for learning how to use the numeric keypad and/or mouse with your non preferred hand from the device selection process.

Three/fifths of all occupational injuries can be attributed to various debilitating hand and wrist disorders according to The John Marshall Journal of Computer and Information Law. Without reliable medical or scientific evidence showing a relationship between use and injury, the question arises, is it necessary for computer manufacturers to begin placing warnings on their keyboards which urge users to pay more attention to safety and comfort??

The said OSHA in their eTool website, alternative left hand keyboards which have the keypad permanently affixed to the left side of the keyboard are available as are keyboards with a detached keypad. These allow the user to switch positions for either left or right hand use. Also programmable stand alone keypads are available which can be programmed to facilitate either right or left hand usage as possible solutions. But this arrangement can be limiting to the left handed workers or right handed workers who are recovering from injury and are attempting to remain functional during recovery.

Ainsworth at www.qwerty.com has a patent describing his development of two-handed input systems and his approach to eliminate carpal tunnel and other RSI problems. But this does not mention any interference in the neural network of the fingers in his Ainsworth Keypad Trainer software program. Ainsworth states you can use either hand for the same device just by positioning the keyboard with keypad. But this does not account for our USA culture for reading sequentially left to right and then transposing that old learning to new learning of the non preferred hand. Due to human factors and brain organization this sequential learning for the non preferred hand will either be parallel sequencing or mirror image sequencing based upon the person's dominance.

Springer and Deutsch in their book Left Brain/Right Brain, (two psychologists) state each hemisphere appears to be approximately a mirror image of the other, very much in keeping with the general left right symmetry of the human body. Their theory of control of the body's basic movements and sensations are evenly divided between the two cerebral hemispheres. But they agree that by examining the abilities of our two hands are not equivalent in all respects. Most people have a dominant hand but few people are truly ambidexterous. In humans, preferences will vary.

Researchers agree there are undoubtedly differences in cerebral lateralization and other features of brain organization which correlate with hand preference and proficiency as a trait variable according to Wilkes and Sheely. They propose left handers are a heterogenous group, some having a dominant right hemisphere and others having a dominant left hemisphere. These varying patterns of brain hardware, in interaction with environmental experience in a dominantly right handed culture, are likely to produce differences in the fine structure of movement organization.

When a subject performs a well learned motor act with the less preferred hand, it is unclear whether the reduced proficiency is due to control by a non dominant hemisphere which is somehow less capable or to interference by inappropriate motor commands from the dominant hemisphere from the same Wilkes and Sheely study of finger movements and handedness.

In the Two Mind Theory in how the brain is organized, visualize the right hemisphere is under left hand control with music, fantasy, art, creativity, genius, perception, emotional expression and a holistic thinking mode. Then for the left hemisphere under right hand control is language, writing, logic, mathematics, science with a linear thinking mode.

The said brain organization studies of Hier, LeMay, Rosenberger and Perlo, McRae, Branch and Milner (1978) conclude that handedness and sidedness are apparent in brain scans and show differences.

The Wilke et al study and method will be shown in the method for dexterity training.

The Grafton et al (2002) explained the human right hemisphere is active during execution of contralateral hand movements, and the left hemisphere is engaged for both contra and ipsilateral movements, at least for right handed subjects. Learning with the left hand also recruited a widespread set of temporal and frontal regions suggesting that motor skill learning with the non dominant hand develops within both cognitive and motor related functional networks. In this study using PET scans and the right hands of participants the stimulus sequence and series of response locations remained unchanged, but the finger movements were different.

The Torque Test used by T. Blau and also Franz et al, similar circling tasks used. Franz et al (2003) in their study asking does handedness determine which hand leads in a bimanual task. Their study tested on a bimanual circle task that required drawing either in the same direction (parallel) or in a mirror symmetrical coordination mode with the two hands. The pattern of results was similar for left and right handers on parallel tasks, but group differences were found with respect to mirror symmetrical tasks. At odds with the general claim that the dominant hand leads, the present results indicated that hand dominance does not generally determine which hand leads.

The Cattaert et al (1999) in their cross talk model for between the hand interference during bimanual circle drawing found under the asymmetrical mode (both limbs moving clockwise or counterclockwise) increases in movement frequency have a disruptive effect on trajectory control and hand coordination. Their theory proved the motor systems controlling each hand are prone to neural cross talk.

The Nalcaci et al (2001) in their study of the relationship between handedness and fine motor performance was to re-investigate the relationship between handedness and asymmetry in hand performance and if there is sex difference in motor asymmetry. In the total sample, the correlation between hand speed and the handedness score indicated that the distribution of hand preference is associated with left hand speed, but not right hand speed. Results also confirmed that right handed females tend to have more asymmetric motor function than right handed males.

Levy and Gur in their neurological studies looked at individual differences in psychoneurolgical organization and found that, as expected, writing requires access to the language hemisphere. Thus, the dominant writing hand always appears to be under the control of the language hemisphere. They concluded it would not matter if the control pathways from the language hemisphere lead directly or indirectly to the ipsilateral (same) hand in others, to the contralateral (opposite) hand.

The noted researcher, Stanley Coren, asks Does Society Make Right Handers? Due to the fact of review of their studies, with less and less numbers of left handers that through the years, culture pressure makes right handers out of left handers. From our culture it is a learned response. Dr. Coren writes when we are talking about handedness and hand control, as many as twenty three brain centers and neural pathways are involved. These include several different movement control systems and position sensing systems that originate in the cerebral cortex.

The Nadler et al (2000) in their study of acquisition of a new motor skill from finger muscles (index and little finger) investigated possible reorganization of central nervous pathways of the non dominant hand. Their findings suggested that learning a new motor skill produces changes which take place predominantly in the cortical pathways of the cutaneomuscular reflex and may be due to changed connectivity within the motor and/or sensory cortex.

The Nachshon (1985) is his study of directional preferences may be a function of either reading and writing habits, or hemispheric asymmetry, or both. In this study between English readers and Arabic readers, English readers showed left to right preferences.

The Singh et al (2000) in their reading/writing vs. handedness with children, both left and right handed with differing reading/writing experiences used a drawing task. Results showed lines drawn from left to right were more accurate.

The Ackland and Hendrie (2002), used a computer mouse alternating between the preferred and non preferred hands believing this would be a viable injury prevention strategy within the workplace. They concluded that, three×30 min sessions of training for a period of three weeks was sufficient to improve control of the mouse by the non preferred hand, cause the non preferred hand to reach a level of proficiency equivalent to that of the preferred hand for work related skills and allow a majority of operators to consider alternating mouse activity between the preferred and non preferred hands in a work environment. They further excluded left handers or workers that used two hands for the cursor.

These occupational hazards are found world wide in all kinds of manual jobs. There are no interventions at this time to prevent the primary prevention of carpal tunnel syndrome in a working population. Despite the societal impact of CTS and growing numbers of commercial remedies of alternative keyboard and keypad designs, none have been based on a person's functional dominance.

Ong et al (1995) in their study of occupational disorders and examined the possible causes and suggest preventive strategies as a multidisciplinary approach. This study mentions causes as poor ergonomic design of the workplace and equipment design.

Yu et al (1996) in their study of VDU workers in a Hong Kong bank believe that arm, hand and wrist problems were more affected by repetitive movements and recommend modification of the work station design.

Muggleton et al, (1999) found musculoskeletal disorders are the most common self reported, work related illness in the UK.

The Dr. Sharan, an Indian Orthopedic doctor presented his latest research in the field of Computer Related Injuries (CRI) at the 47th Annual Conference in 2002. He defines CRI as a constellation of work related symptoms in computer users. It is a diffuse disorder of muscle, fascia, tendon and/or neurovascular structures, which typically involve the neck and upper limb. Dr. Sharon conducts on site CRI Clinics and ergonomic consulting for Hewlett Packard at Bangalore whereby he treated over 250 IT professionals. He has successfully treated over 700 CRI and over 700 IT professionals from Compaq, Infosys, IBM, and ISRO have attended his training programs on CRI prevention?.

The Pascarelli et al (1993) in their study of soft tissue injuries related to use of the computer keyboard believed that harmful inefficient keyboard styles (intrinsic ergonomic factors) and changes in the workstation (extrensic ergonomic factors) must be addressed and corrected by a combination of factors including technique retraining and education.

In a presentation by this inventor in 2005 of the American Society of Women Accountants, a survey was used following: results of 85% were right handed, 42% had symptoms of computer related hand complaints, 80% used a computer at home and at work, an average of 15 years of computer use work experience, the Blau handwriting test results of parallel 50% and mirror image 50% and the Wilke-Sheeley finger circling test parallel 25% and mirror image 75%.

In a presentation to fellow professional writers in 2005, the results of this group were 92% used their right hand for writing, 66% had symptoms of hand or finger complaints from writing/computing, 70% used a computer at home, 25% used a computer both at home and at the office, an average of 12.9 years of computer use, the Blau handwriting test results were parallel 75% and mirror image 25% and the finger circling test with parallel 45% and mirror image 55%.

In a presentation to a group of comptrollers, auditors and accountants by this inventor, in 2005, the results showed 69% were right handed, 21% left handed and 8% mixed handed, 47% had hand and finger complaints and 1 shoulder, after testing 39% were mirror/mirror image, 26% were parallel/parallel image, 34% had different mirror/parallel image or parallel/mirror image results.

Following these three presentations of computer users, the invention of the dual systems and the training programs were written for left hand usage. With development of this system of input selection for dual keypadding or dual mice, a great service would be accomplished providing a dramatic downturn in expenses of medical occupational diseases.

BRIEF DESCRIPTION/DRAWING (PRIOR ART)

Figure 5:
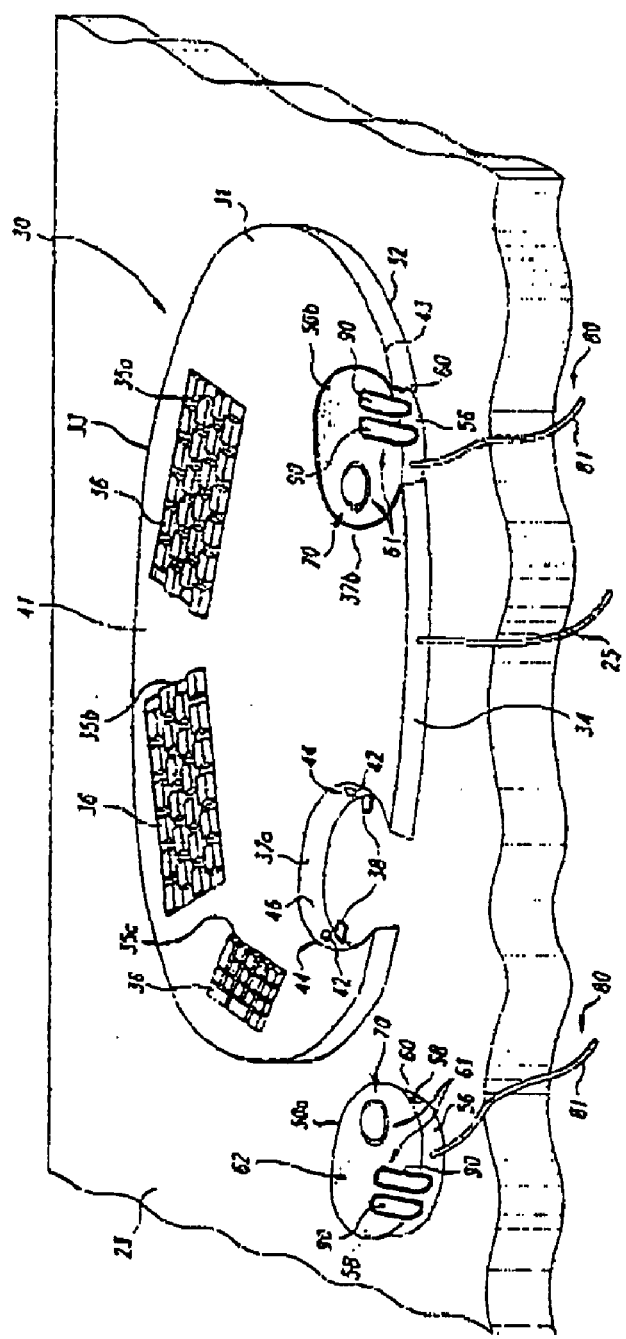
Figure 6:
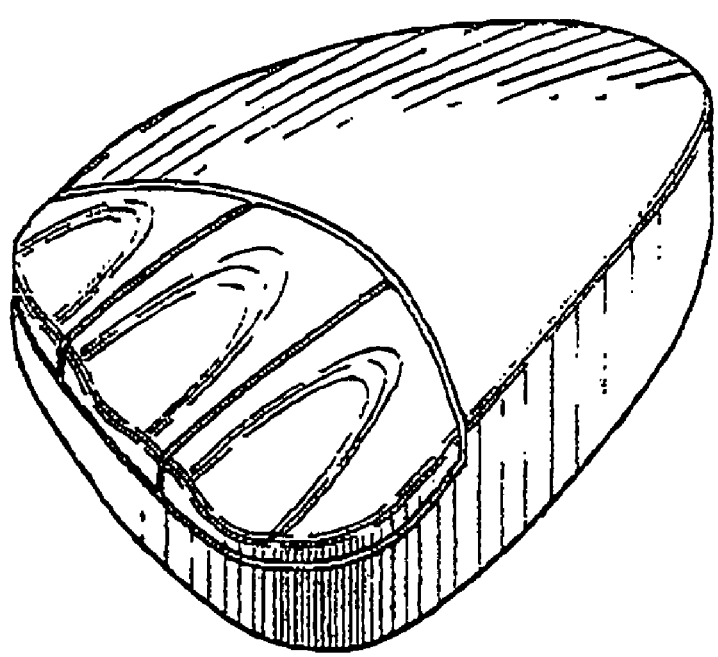

FIG. 1, example of a basic keyboard
FIG. 2, example of the Standard Qwerty Layout (2A) and Dvorak layout for two hands (2B)
FIG. 3, example of left to right numerical keypad (3A and 3B)
FIG. 4, example of right to left numerical keypad (4A and 4B)
FIG. 5, example of an alternative keyboard
FIG. 6, example of a cordless electronic mouse

DETAILED DESCRIPTION OF THE INVENTION

An appropriate psychological test, i.e. Dr. Theodore H. Blau, may be used to conduct, administer directionality for the numerical keypad as found in the book When Left is Right: Keyboarding for Success. The Table will show the eight directions for circling of the right hand and left hand.

An appropriate psychological test i.e. The Wilke-Sheeley study (1979) may be used to conduct and administer the index finger direction of movement as in their analysis of preferred direction of movements showed that strong right handers tend to move both left and right index fingers in the same direction and familial left handers tend to move them in opposite directions. Their study results indicate that interhemispheric interference in a motor skill consists of activation of inappropriate muscles of the non preferred hand by the dominant ipsilateral (same) hemisphere as its attempts to force that hand to conform to the direction of movement preferred by the dominant hand.

The method used for proper selection of devices comprise instructions for determining directionality for the left hand and fingers and then to select the proper devices based on determination of dominance for the computer user. The Table by Wilke-Sheeley will show the direction of movement of the index fingers of right and left and ambiguous handedness results. The said results of the two sets of instructions will help as your computer workstation is set up to assist in the selection of devices for numbers and mouse (keypad, calculator, pointing device). The numerical keypads and mouse have long term and short term goals. The injured workers short term goal who is unable to use or limit or not use their right hand at work due to carpal tunnel syndrome or repetitive strain injury of the right hand would be trained to use an added stand alone keypad/calculator office or business machines with the left hand a dual keyboard/keypad or a mouse/pointing device. Based upon the users job tasks and limitations, this system of input device selection would be set up using the software and hardware with the operating system of the user or the company at their expense.

The long term solution for carpal tunnel syndrome is to use a dual keypad/computer keyboard when learning to use the computer in schools, classes or universities. This system would be set up with the software and hardware and operating system of the school or university working with their computer provider. The invention is intended for the data input of numerical data that would normally involve the use of a standard numerical keypad. It will make use of numerical input key layouts. The invention allows for the user to select and use a numerical keypad/input device based on their hand dominance and the result of the cerebral dominance determination instructions.

The Theordore Blau instructions and Torque Test circling instructions with the table outlining the eight different torque responses of his psychological test of cerebral dominance are of importance in this invention. The circling instructions are: on the right side of a piece of paper, with your right hand, draw three circles down the page then draw a circle around each X. Note which way you start the circle and end your circle with an arrow mark for ease of review and on the left side of the same paper, with your left hand, draw three X's and then circle each one noting with an arrow mark the direction for ease of review and in your self analysis, you will be able to tell which Torque Response from your direction of circling. The circles results show which side of the brain is dominant; and right handed people with a dominant left brain tend to draw their circles counterclockwise, no matter which hand is used to draw the circles; and left handed people tend to draw clockwise circles no matter which hand is used. Drawing some of the circles one way or the other is an indication of mixed dominance; and determining hand and finger directionality based on test results.

The Wilke-Sheeley instructions explain the subject's task was simply to draw a circle in the air with the index finger of each hand separately. Note the dependent variable is direction of movement (clockwise or counterclockwise); and right handed, left handed and ambiguous male and female subjects perform circular index finger movements; and the analysis of preferred directional movements show that strong right handers tend to move both left and right index fingers in the same direction, and familial left handers tend to move them in opposite directions; and since right handers tend to possess a strong dominant left hemisphere, while familial left handers exhibit a high degree of cerebral lateral equipotentiality, the result indicates that interhemispheric preference in a motor skill consists of activation of inappropriate muscles of the non-preferred hand by the dominant ipsilateral (same) hemisphere as its attempted to force that hand to conform to the direction of movement preferred by the dominant hand.

Input devices used with PC's based on this invention should utilize USB connection technology and standard drivers for use with Windows, MacOS and Linux based PCs.

For the basic use of this concept, no special software should be required, however, special software could be used to aid in the training in the use of these input devices utilizing dexterity training. Keypad placement (left or right of user) and key layout (Standard layout or the mirrored layout should be able to be changed by the user with ease based on which hand they are more efficient with depending on the task at hand. This invention aims to make these layouts accessible to users to learn and use to reduce RSI (repetitive strain injury) that would otherwise occur.

A. A right hand user may prefer to use a mouse or other pointing device with their right hand while entering numerical data with their left. Depending on their hand dominance and other factors, they may be more efficient and incur less stress while performing the data input with the different key layout offered with this invention.

B. A left handed user may prefer to use a mouse or other pointing device in their left hand, while entering data with their right hand. Or, they may prefer to enter data with their left hand. A left hand dominant user may prefer the standard key layout on the left side, or the mirrored layout on the right.

C. In the case of adding machines, also referred to as office machines, or tape calculators, a left handed user may prefer the new keypad layout in this invention, which mirrors the typical layout found in most calculators.

This patent application explains differences in the human factors for computer keyboard and numerical pad and mouse and office machines users. Following device selection for the left hand side of the computer workstation, the computer user may wish to purchase the book When Left is Right: Keyboarding for Success.

This invention is based on hand and brain dominance of the users. The set ups for right handed and left handed users of computers with numerical keyboard set ups must be different due to brain organization or cerebral dominance of computer users. Some keyboard users have developed muscle and tendon diseases due to a medical condition and some to work related overuse or repetition. Frequently this places the computer user out of work whether work related or the recreational at home computer user. Companies that invest consistently in safety realize positive bottom line results, reduced absenteeism, lower turnover rates, higher productivity, increased employee morale and a positive brand image, according to the FARA Expert Times, April 2004 issue. The majority of the population world wide are right handed; 10 to 20% are percentages often used in studies of left or mixed handedness. The right hand is used for the regular numerical keyboard on computers or for business machines. Often during treatment by their physician, work limitations will be given i.e. no use of right arm or right hand and wrist. These computer users are often out of work as their employers cannot provide another system or adaptation of the numerical keyboard as a part of their work limitations. By providing in house training with the When Left is Right system is used, the injured worker may continue at work by training the left hand for numerical data entry. The keypads for both right and left numerical data systems should have a selection of clock wise or counter clock wise setup either as a part of the keyboard or other design of the keyboard. The usual and customary set up of numbers on the right side of the keypad are 1, 2, 3 going from left to right. Programmable keypads are suited for the left side of the computer keyboard, keypad. The stand alone numerical keypad added to the left side of the keyboard will be used as a substitute for the keypad already in place for the injured worker to use as the alternative to the right side keypad until such time as the worker is able to use either hand. This stand alone keypad is added with either a USB port or PC software program. Too, this keypad and numbers would be set up either on a left to right basis or a right to left basis, dependent upon their hand and brain dominance. By using a lengthening provided by a sliding tray, stability will be maintained on the left side just as the right side.

There are several dominance tests for brain and hand dominance. Educational systems (inventories, tests) have been developed by scientists, psychologists and others interested in working with the gifted to the disabled to assist with the coordination of hand and finger movement. But, the trial and error method may also be used to select how the numbers are set up. But this is expensive and wasteful as what you initially buy may not fit the person. One must look beyond what will fit your computer and hardware but at your human user factors when purchasing input devices and keyboards for the non trial and error or more definitive system of configuring for left hand usage of input devices. A programmable keypad for the left hand can be instrumental in increasing productivity, saving your hands, saving your money and perhaps saving your job.

When selecting between all available programmable keypads, keep in mind and review which type will fit your PC machine. Also you need to review any requirement of certain software applications needed to function but these should come with the keypad in the form of downloaded through the company's website.

IBM received many complaints about their first keyboard design and through the years several improvements have been made. The biggest concern at this time and remains unaddressed by any company known is why the right side of the keyboard is so overloaded.

Some companies (Fentek Industries) have addressed this with a left handers keyboard whereby the right keypad was moved to the left. This same company now has addressed the left hander's difficulty in design by making a mirror image design on the left sided keypad. But no instructions are given on which one to purchase regarding numerical directions for the keypad.

Most keyboards whether they are included in new PC's, sold separately, are some variation of the 104-key Windows keyboard layout. Some keyboards have Windows support built in. The computer keyboard has three key physical groups with the numeric keypad placed on the right. Extra numeric keypads have been added to some keyboards. In these enhanced computer keyboards created by IBM, the cursor controls are available using the numeric keypad. There has been art deficiency and many opportunities for improvement but difficulties experienced by the users, both in regular keyboarding but also in numerical keypads over the last two decades. There remains much improvement to be made. The standard or regular keyboard has not changed since the mouse introduction. How to manipulate the keyboard, the mouse and the numerical keypad on the right is an overloaded or non symmetric system for right handed users. Even the left hander must use the right handed keyboard. Not only does the users right hand move back and forth between the mouse and the keyboard but how to use the numerical keypad and mouse by the right hander at the same time.

The Numeric Keypad was designed for data entry numerically. Common elements are found with the standard desktop calculator with several software applications that are similar to a desktop calculator.

The present invention is directed to a hand dominated computer keyboard and the keyboard cluster numbers location based on the users hand dominance for use by Safety and Health Officers to reduce their employee's related hand and arm injuries from worker overuse and employer abuse and poor design by computer keyboard makers. New learning will be required of those injured workers with adaptation of using alternative ergonomic keyboards and keypads. Companies like banks, financial institutions, credit card companies, health care and insurance companies are large users of computer keyboards and keypads. Many of these companies have two to three shifts of workers to accomplish their production guidelines. As a result of this, there may be negligent liability from the design of the computer and keyboard but also liability with failure to warn on the part of the employers with large numbers of employees with these types of complaints, lost time, lost wages and some lost jobs by using the overloaded right side of keyboards. The computer industry is rapidly developing changes for keyboard users. OSHA estimates that work-related musculoskeletal disorders in the US account for over 600,000 injuries and illnesses that are serious enough to result in days away from work (34 percent of all lost workday injuries report the BLS). It is estimated that employers spend as much as $15–18 billion a year on direct costs for these types of injuries from the website of OSHA. There are keyboard users that have developed both right and left handed injuries and are unable to use their hands and arms. Voice recognition systems have been developed, but these are very slow systems. Too, foot pedal systems have been developed to accomplish the same for these keyboard users with both hand injuries.

For those injured workers with mouse connected injuries; the roller ball mouse was developed. In this past year, a company developed a keyboard for left handers with several variations for both PC and Mac users, developers in keyboard design know we have a problem. Numerical pad development improvements are also being made but these are not of the likeness of the original keyboard and new learning will be required to operate those. Many left handers have been taught to use the basic keyboard with the numerical portion on the right not the left. So there is a need to use and develop this system of keyboard design and educational efforts to support this concept for dexterity. Another system for the new learner in colleges, universities or other business schools would use the dual keyboard with the standard typing portion the same but with two numerical pads, one on each side. The new learner would learn at the onset of keyboard use the problem of overuse and repetition and this would relieve the situation in the years ahead for OSHA, BLS and industry in general.

The electronics industry has developed many patents for input devices without regard to the human factors of dominance and use of the left hand. The instructions using the Blau and Wilke-Sheeley studies show the cerebral dominance of the computer user for the standard computer keyboard, mirrored and parallel number directionality in both input devices of keypads and calculators, standard and non standard mouse and pointing devices with clickers for the right and left hand index fingers, dual numerical keyboard/keypad set ups for improved productivity, rearrangement of the computer workstation, anatomy of the hand, brain and handedness crossover, this program should be developed to use in training programs at universities or schools for computer users in their initial learning experience and to become not only dual handed in alphabetical computer use but for this invention, dual handed for numerical keypad use and stand alone numerical office machine (calculator) based on user dominance and the mouse preference for the right or left hand side of the computer keyboard. Through coordination education, completion of the handedness inventory, handwriting test and finger circling test, the results shown explain the human differences in laterality when using the hands at the computer workstation. Frequently the terms for parallel and mirror image brain organization are used rather than clockwise and counter clockwise. In a medical facility magnetic resonance imaging (MRI), PET or CT scans can test for parallel or mirror imaging for either hand direction or index finger direction. This is expensive. Corporate America needs low cost and easy testing to determine how to select input devices. There are other psychological tests to determine cerebral dominance. But both of the instructions from Blau and Wilke-Sheeley as found in the book When Left is Right: Keyboarding for Success are easy to use and there is no cost for the testing. The dexterity training and device selection recommendations for both keypad and mouse selection are copyrighted by this author/inventor.

I claim:

1. A method for the non-trial and error definitive selection of a numerical input device for the left hand of a user based on the human factors of dominance research comprising:
administering a plurality of cerebral dominance tests;
wherein said plurality of cerebral dominance tests involve a torque and/or circling motion between both hands of the user for determining hand and finger directionality;
wherein said plurality of cerebral dominance tests comprise: a parallel clockwise—clockwise dominance test, a mirror image counter-clockwise clockwise dominance test, a mirror image clockwise-counter clockwise dominance test, and a handedness and finger directionality test;
the parallel clockwise—clockwise dominance test results with a subsequent recommendation for left to right number direction for the left hand for the device,
the mirror image clockwise-counter clockwise dominance test results with a subsequent recommendations for right to left number direction for the left hand for the device;
comparing the plurality of cerebral dominance test results against one another to determine hand and finger directionality;
selecting said numerical input device based on the determination of hand and finger directionality;
wherein the selection of the said numerical input device is from a group consisting of: a keyboard, a numerical data input device, a calculator, a ten key calculator, an alternative keyboard, an alternative keypad, or a dual keyboard and keypad; and
configuring said numerical input device based on the determination of the plurality of cerebral dominance test results.

2. A method for the non-trial and error definitive selection of a mouse/pointing device for one of the index fingers of a user based on the human factors of dominance research comprising:
administering a plurality of cerebral dominance tests;
wherein said plurality of cerebral dominance tests involve a torque and/or circling motion between both hands of the user for determining hand and index finger directionality;
wherein said plurality of cerebral dominance tests comprise: a
parallel clockwise—clockwise dominance test, a mirror image counter-clockwise clockwise dominance test, a mirror image clockwise-counter clockwise dominance test, and a handedness and finger directionality test;
comparing the plurality of cerebral dominance test results against one another to determine hand and finger directionality;
selecting the appropriate mouse/pointing device based on the determination;
wherein the selection of the said mouse/pointing device is from a group consisting of: a mouse/pointing device, a mouse, a pointing device, an alternative mouse or pointing device, or a dual keyboard and dual mouse;
configuring said selected mouse/pointing device based on the determination of the plurality of cerebral dominance test results; and
determining a location of the mouse/pointing device relative to a numerical input device based on the determination of the plurality of cerebral dominance test results.

* * * * *